(12) United States Patent
Scuderi

(10) Patent No.: US 6,880,502 B2
(45) Date of Patent: Apr. 19, 2005

(54) SPLIT FOUR STROKE ENGINE

(76) Inventor: Carmelo J. Scuderi, 173 Prospect St., Springfield, MA (US) 01107

( * ) Notice: Subject to any disclaimer, the term of this patent is extended or adjusted under 35 U.S.C. 154(b) by 0 days.

(21) Appl. No.: 10/615,550

(22) Filed: Jul. 8, 2003

(65) Prior Publication Data

US 2004/0050046 A1 Mar. 18, 2004

Related U.S. Application Data

(63) Continuation-in-part of application No. 10/139,981, filed on May 7, 2002, now Pat. No. 6,609,371, which is a continuation of application No. 09/909,594, filed on Jul. 20, 2001, now Pat. No. 6,543,225.

(51) Int. Cl.$^7$ .............................................. F02B 33/22
(52) U.S. Cl. .................................................. 123/70 R
(58) Field of Search ........................... 123/70 R, 70 V, 123/71 R, 316, 53.1, 53.5, 52.2, 52.3, 55.4

(56) References Cited

U.S. PATENT DOCUMENTS

| | | | |
|---|---|---|---|
| 810,347 | A | 1/1906 | Porter et al. |
| 848,029 | A | 3/1907 | Haselwander |
| 939,376 | A | 11/1909 | Appleton |
| 1,111,841 | A | 9/1914 | Koenig |

(Continued)

FOREIGN PATENT DOCUMENTS

| | | |
|---|---|---|
| DE | 25 15 271 | 10/1976 |
| DE | 26 28 155 | 1/1978 |
| FR | 24163344 | 8/1979 |
| GB | 299.602 | 11/1928 |
| GB | 383866 | 11/1932 |
| GB | 721.025 | 12/1954 |
| IT | 505576 | 12/1954 |
| JP | 51-39306 | 4/1976 |
| JP | 51-91416 | 8/1976 |
| JP | 54-89108 | 7/1979 |
| JP | 56-8815 | 2/1981 |
| JP | 56-99018 | 5/1981 |
| JP | 56-145641 | 11/1981 |
| JP | 57-181923 | 11/1982 |
| JP | 60-143116 | 9/1985 |
| JP | 60-256642 | 12/1985 |
| JP | 62-126523 | 8/1987 |
| JP | 63-124830 | 5/1988 |
| JP | 5-502707 | 5/1993 |
| JP | 5-156954 | 6/1993 |
| JP | 6-159836 | 6/1994 |
| JP | 8-503043 | 4/1996 |
| JP | 8-158887 | 6/1996 |
| JP | 8-232675 | 9/1996 |

(Continued)

OTHER PUBLICATIONS

JSAE Convention Proceedings, Date 1996, Issue 966, pp. 129–132.

www.tiscali.co.za/moto/moto_center_011011.403978.html, pp. 1–2.

Primary Examiner—Henry C. Yuen
Assistant Examiner—Hyder Ali

(57) ABSTRACT

An engine includes a crankshaft, rotating about a crankshaft axis of the engine. A power piston is slidably received within a first cylinder and is operatively connected to the crankshaft via first linkage system. The power piston reciprocates through a power stroke and an exhaust stroke of a four stroke cycle during a single rotation of the crankshaft. A compression piston is slidably received within a second cylinder and operatively connected to the crankshaft via second linkage system. The first and second linkage systems share no common mechanical link. The compression piston reciprocates through an intake stroke and a compression stroke of the same four stroke cycle during the same revolution of the crankshaft. The power piston leads the compression piston by a phase shift angle that is substantially equal to or greater than zero degrees and less than 30 degrees.

4 Claims, 7 Drawing Sheets

U.S. PATENT DOCUMENTS

| | | |
|---|---|---|
| 1,248,250 A | 11/1917 | Bohler |
| 1,301,141 A | 4/1919 | Leadbetter et al. |
| 1,392,359 A | 10/1921 | Rudqvist |
| 1,856,048 A | 4/1932 | Ahrens |
| 1,969,815 A | 8/1934 | Meyer |
| 2,154,856 A | 4/1937 | Mallory |
| 2,091,410 A | 8/1937 | Mallory |
| 2,091,411 A | 8/1937 | Mallory |
| 2,091,412 A | 8/1937 | Mallory |
| 2,091,413 A | 8/1937 | Mallory |
| 2,269,948 A | 1/1942 | Mallory |
| 2,280,712 A | 4/1942 | Mallory |
| 2,957,455 A | 10/1960 | Bouyy |
| 2,974,541 A | 3/1961 | Dolza |
| 3,623,463 A * | 11/1971 | De Vries ................. 123/70 R |
| 3,774,581 A | 11/1973 | Lundy |
| 3,895,614 A | 7/1975 | Bailey |
| 4,450,754 A | 5/1984 | Liljequist |
| 4,628,876 A | 12/1986 | Fujikawa et al. |
| 4,805,571 A | 2/1989 | Humphrey |
| 4,945,866 A | 8/1990 | Chabot, Jr. |
| 4,955,328 A | 9/1990 | Sobotowski |
| 5,146,884 A | 9/1992 | Merkel |
| 5,546,897 A | 8/1996 | Brackett |
| 5,623,894 A | 4/1997 | Clarke |
| 5,711,267 A | 1/1998 | Williams |
| 5,799,636 A | 9/1998 | Fish |
| 5,950,579 A | 9/1999 | Ott |
| 5,992,356 A | 11/1999 | Howell-Smith |
| 6,058,901 A | 5/2000 | Lee |
| 6,202,416 B1 | 3/2001 | Gray, Jr. |
| 6,230,671 B1 | 5/2001 | Achterberg |
| 6,543,225 B1 * | 4/2003 | Scuderi ................. 60/597 |
| 6,609,371 B1 * | 8/2003 | Scuderi ................. 60/597 |
| 6,722,127 B1 * | 4/2004 | Scuderi et al. ............ 60/597 |

FOREIGN PATENT DOCUMENTS

| | | |
|---|---|---|
| JP | 8-261004 | 10/1996 |
| JP | 2000-508403 | 7/2000 |
| JP | 2001-12250 | 1/2001 |
| JP | 2001-207801 | 8/2001 |
| JP | 2002-506949 | 3/2002 |
| SU | 1551880 A1 | 3/1990 |
| WO | WO01/16470 A1 | 3/2001 |

* cited by examiner

SPLIT FOUR STROKE ENGINE

CROSS REFERENCE TO RELATED APPLICATIONS

This patent application is a continuation application of U.S. application Ser. No. 10/139,981, filed May 7, 2002 now U.S. Pat. No. 6,609,371, entitled "SPLIT FOUR STROKE ENGINE", herein incorporated by reference in its entirety, which is a continuation application of U.S. application Ser. No. 09/909,594 (now U.S. Pat. No. 6,543,225), filed Jul. 20, 2001, entitled "SPLIT FOUR STROKE CYCLE INTERNAL COMBUSTION ENGINE", herein incorporated by reference in its entirety.

FIELD OF THE INVENTION

The present invention relates to internal combustion engines. More specifically, the present invention relates to a four-stroke cycle internal combustion engine having a pair of offset pistons in which one piston of the pair is used for the intake and compression strokes and another piston of the pair is used for the power and exhaust strokes, with each four stroke cycle being completed in one revolution of the crankshaft.

BACKGROUND OF THE INVENTION

Internal combustion engines are any of a group of devices in which the reactants of combustion, e.g., oxidizer and fuel, and the products of combustion serve as the working fluids of the engine. The basic components of an internal combustion engine are well known in the art and include the engine block, cylinder head, cylinders, pistons, valves, crankshaft and camshaft. The cylinder heads, cylinders and tops of the pistons typically form combustion chambers into which fuel and oxidizer (e.g., air) is introduced and combustion takes place. Such an engine gains its energy from the heat released during the combustion of the non-reacted working fluids, e.g., the oxidizer-fuel mixture. This process occurs within the engine and is part of the thermodynamic cycle of the device. In all internal combustion engines, useful work is generated from the hot, gaseous products of combustion acting directly on moving surfaces of the engine, such as the top or crown of a piston. Generally, reciprocating motion of the pistons is transferred to rotary motion of a crankshaft via connecting rods.

Internal combustion (IC) engines can be categorized into spark ignition (SI) and compression ignition (CI) categories. SI engines, i.e. typical gasoline engines, use a spark to ignite the air-fuel mixture, while the heat of compression ignites the air fuel mixture in CI engines, i.e., typically diesel engines.

The most common internal-combustion engine is the four-stroke cycle engine, a conception whose basic design has not changed for more than 100 years old. This is because of its outstanding performance as a prime mover in the ground transportation industry. In a four-stroke cycle engine, power is recovered from the combustion process in four separate piston movements (strokes) of a single piston. For purposes herein, a stroke is defined as a complete movement of a piston from a top dead center position to a bottom dead center position or vice versa. Accordingly, a four-stroke cycle engine is defined herein to be an engine which requires four complete strokes of one or more pistons for every power stroke, i.e. for every stroke that delivers power to a crankshaft.

Referring to FIGS. 1–4, an exemplary embodiment of a prior art four stroke cycle internal combustion engine is shown at 10. For purposes of comparison, the following four FIGS. 1–4 describe what will be termed a prior art "standard engine" 10. As will be explained in greater detail hereinafter, this standard engine 10 is an SI engine with a 4 inch diameter piston, a 4 inch stroke and an 8 to 1 compression ratio. The compression ratio is defined herein as the maximum volume of a predetermined mass of an air-fuel mixture before a compression stroke, divided by the volume of the mass of the air-fuel mixture at the point of ignition. For the standard engine, the compression ratio is substantially the ratio of the volume in cylinder 14 when piston 16 is at bottom dead center to the volume in the cylinder 14 when the piston 16 is at top dead center.

The engine 10 includes an engine block 12 having the cylinder 14 extending therethrough. The cylinder 14 is sized to receive the reciprocating piston 16 therein. Attached to the top of the cylinder 14 is the cylinder head 18, which includes an inlet valve 20 and an outlet valve 22. The cylinder head 18 cylinder 14 and top (or crown 24) of the piston 16 form a combustion chamber 26. On the inlet stroke (FIG. 1), a fuel air mixture is introduced into the combustion chamber 26 through an intake passage 28 and the inlet valve 20, wherein the mixture is ignited via spark plug 30. The products of combustion are later exhausted through outlet valve 22 and outlet passage 32 on the exhaust stroke (FIG. 4). A connecting rod 34 is pivotally attached at its top distal end 36 to the piston 16. A crankshaft 38 includes a mechanical offset portion called the crankshaft throw 40, which is pivotally attached to the bottom distal end 42 of connecting rod 34. The mechanical linkage of the connecting rod 34 to the piston 16 and crankshaft throw 40 serves to convert the reciprocating motion (as indicated by arrow 44) of the piston 16 to the rotary motion (as indicated by arrow 46) of the crankshaft 38. The crankshaft 38 is mechanically linked (not shown) to an inlet camshaft 48 and an outlet camshaft 50, which precisely control the opening and closing of the inlet valve 20 and outlet valve 22 respectively.

The cylinder 14 has a centerline (piston-cylinder axis) 52, which is also the centerline of reciprocation of the piston 16. The crankshaft 38 has a center of rotation (crankshaft axis) 54. For purposes of this specification, the direction of rotation 46 of the crankshaft 38 will be in the clockwise direction as viewed by the reader into the plane of the paper. The centerline 52 of the cylinder 14 passes directly through the center of rotation 54 of the crankshaft 38.

Referring to FIG. 1, with the inlet valve 20 open, the piston 16 first descends (as indicated by the direction of arrow 44) on the intake stroke. A predetermined mass of an explosive mixture of fuel (gasoline vapor) and air is drawn into the combustion chamber 26 by the partial vacuum thus created. The piston continues to descend until it reaches its bottom dead center (BDC), the point at which the piston is farthest from the cylinder head 18.

Referring to FIG. 2, with both the inlet 20 and outlet 22 valves closed, the mixture is compressed as the piston 16 ascends (as indicated by the direction of arrow 44) on the compression stroke. As the end of the stroke approaches top dead center (TDC), i.e., the point at which the piston 16 is closest to the cylinder head 18, the volume of the mixture is compressed to one eighth of its initial volume (due to an 8 to 1 compression ratio). The mixture is then ignited by an electric spark from spark plug 30.

Referring to FIG. 3, the power stroke follows with both valves 20 and 22 still closed. The piston 16 is driven downward (as indicated by arrow 44) toward bottom dead center (BDC), due to the expansion of the burned gas pressing on the crown 24 of the piston 16. Since the spark plug 30 is fired when the piston 16 is at or near TDC, i.e. at its firing position, the combustion pressure (indicated by arrow 56) exerted by the ignited gas on the piston 16 is at its maximum at this point. This pressure 56 is transmitted through the connecting rod 34 and results in a tangential force or torque (as indicated by arrow 58) on the crankshaft 38.

When the piston 16 is at ifs firing position, there is a significant clearance distance 60 between the top of the cylinder 14 and the crown 24 of the piston 16. Typically, the clearance distance is between 0.5 to 0.6 inches. For the standard engine 10 illustrated the clearance distance is substantially 0.571 inches. When the piston 16 is at its firing position conditions are optimal for ignition, i.e., optimal firing conditions. For purposes of comparison, the firing conditions of this engine 10 exemplary embodiment are: 1) a 4 inch diameter piston, 2) a clearance volume of 7.181 cubic inches, 3) a pressure before ignition of approximately 270 pounds per square inch absolute (psia), 4) a maximum combustion pressure after ignition of approximately 1200 psia and 5) operating at 1400 RPM.

This clearance distance 60 corresponds typically to the 8 to 1 compression ratio. Typically, SI engines operate optimally with a fixed compression ratio within a range of about 6.0 to 8.5, while the compression ratios of CI engines typically range from about 10 to 16: The piston's 16 firing position is generally at or near TDC, and represents the optimum volume and pressure for the fuel-air mixture to ignite. If the clearance distance 60 were made smaller, the pressure would increase rapidly.

Referring to FIG. 4, during the exhaust stroke, the ascending piston 16 forces the spent products of combustion through the open outlet (or exhaust) valve 22. The cycle then repeats itself. For this prior art four stoke cycle engine 10, four stokes of each piston 16, i.e. inlet, compression, power and exhaust, and two revolutions of the crankshaft 38 are required to complete a cycle, i.e. to provide one power stroke. Problematically, the overall thermodynamic efficiency of the standard four stroke engine 10 is only about one third ($\frac{1}{3}$). That is $\frac{1}{3}$ of the work is delivered to the crankshaft, $\frac{1}{3}$ is lost in waste heat, and $\frac{1}{3}$ is lost out of the exhaust.

As illustrated in FIGS. 3 and 5, one of the primary reasons for this low 20 efficiency is the fact that peak torque and peak combustion pressure are inherently locked out of phase. FIG. 3 shows the position of the piston 16 at the beginning of a power stroke, when the piston 16 is in its firing position at or near TDC. When the spark plug 30 fires, the ignited fuel exerts maximum combustion pressure 56 on the piston 16, which is transmitted through the connecting rod 34 to the crankshaft throw 40 of crankshaft 38. However, in this position, the connecting rod 34 and the crankshaft throw 40 are both nearly aligned with the centerline 52 of the cylinder 14. Therefore, the torque 58 is almost perpendicular to the direction of force 56, and is at its minimum value. The crankshaft 38 must rely on momentum generated from an attached flywheel (not shown) to rotate it past this position.

Referring to FIG. 5, as the ignited gas expands in the combustion chamber 26, the piston 16 descends and the combustion pressure 56 decreases. However, as the crankshaft throw 40 rotates past the centerline 52 and TDC, the resulting tangential force or torque 58 begins to grow. The torque 58 reaches a maximum value when the crankshaft throw 40 rotates approximately 30 degrees past the centerline 52. Rotation beyond that point causes the pressure 56 to fall off so much that the torque 58 begins to decrease again, until both pressure 56 and torque 58 reach a minimum at BDC. Therefore, the point of maximum torque 58 and the point of maximum combustion pressure 56 are inherently locked out of phase by approximately 30 degrees.

Referring to FIG. 6, this concept can be further illustrated. Here, a graph of tangential force or torque versus degrees of rotation from TDC to BDC is shown at 62 for the standard prior art engine 10. Additionally, a graph of combustion pressure versus degrees of rotation from TDC to BDC is shown at 64 for engine 10. The calculations for the graphs 62 and 64 were based on the standard prior art engine 10 having a four inch stroke, a four inch diameter piston, and a maximum combustion pressure at ignition of about 1200 PSIA. As can be seen from the graphs, the point of maximum combustion pressure 66 occurs at approximately 0 degrees from TDC and the point of maximum torque 68 occurs approximately 30 degrees later when the pressure 64 has been reduced considerably. Both graphs 62 and 64 approach their minimum values at BDC, or substantially 180 degrees of rotation past TDC.

An alternative way of increasing the thermal dynamic efficiency of a four stoke cycle engine is to increase the compression ratio of the engine. However, automotive manufactures have found that SI engines typically operate optimally with a compression ratio within a range of about 6.0 to 8.5, while CI engines typically operate best within a compression ratio range of about 10 to 16. This is because as the compression ratios of SI or CI engines increase substantially beyond the above ranges, several other problems occur which outweigh the advantages gained. For example, the engine must be made heavier and bulkier in order to handle the greater pressures involved. Also problems of premature ignition begin to occur, especially in SI engines.

Many rather exotic early engine designs were patented. However, none were able to offer greater efficiencies or other significant advantages, which would replace the standard engine 10 exemplified above. Some of these early patents included: U.S. Pat. Nos. 848,029; 939,376; 1,111,841; 1,248,250; 1,301,141; 1,392,359; 1,856,048; 1,969,815; 2,091,410; 2,091,411; 2,091,412; 2,091,413; 2,269,948; 3,895,614; British Patent No. 299,602; British Patent No. 721,025 and Italian Patent No. 505,576.

In particular the U.S. Pat. No. 1,111,841 to Koenig disclosed a prior art split piston/cylinder design in which an intake and compression stroke was accomplished in a compression piston 12/cylinder 11 combination, and a power and an exhaust stroke was accomplished in an engine piston 7/cylinder 8 combination. Each piston 7 and 12 reciprocates along a piston cylinder axis which intersected the single crankshaft 5 (see FIG. 3 therein). A thermal chamber 24 connects the heads of the compression and engine cylinders, with one end being open to the engine cylinder and the other end having a valued discharge port 19 communicating with the compressor cylinder. A water cooled heat exchanger 15 is disposed at the top of the compressor cylinder 11 to cool the air or air/fuel mixture as it is compressed. A set of spaced thermal plates 25 are disposed within the thermal chamber 24 to re-heat the previously cooled compressed gas as it passes through.

It was thought that the engine would gain efficiency by making it easier to compress the gas by cooling it. Thereafter, the gas was re-heated in the thermal chamber in order to increase its pressure to a point where efficient ignition could take place. Upon the exhaust stroke, hot exhaust gases were passed back through the thermal chamber and out of an exhaust port 26 in an effort to re-heat the thermal chamber.

Unfortunately, transfer of gas in all prior art engines of a split piston design always requires work, which reduces efficiency. Additionally, the added expansion from the thermal chamber to the engine cylinder of Koenig also reduced compression ratio. The standard engine 10 requires no such transfer process and associated additional work. Moreover, the cooling and re-heating of the gas, back and forth through the thermal chamber did not provide enough of an advantage to overcome the losses incurred during the gas transfer process. Therefore, the Koenig patent lost efficiency and compression ratio relative to the standard engine 10.

For purposes herein, a crankshaft axis is defined as being offset from the piston cylinder axis when the crankshaft axis and the piston-cylinder axis do not intersect. The distance between the extended crankshaft axis and the extended piston-cylinder axis taken along a line drawn perpendicular to the piston cylinder axis is defined as the offset. Typically, offset pistons are connected to the crankshaft by well-known connecting rods and crankshaft throws. However, one skilled in the art would recognize that offset pistons may be operatively connected to a crankshaft by several other mechanical linkages. For example, a first piston may be connected to a first crankshaft and a second piston may be connected to a second crankshaft, and the two crankshafts may be operatively connected together through a system of gears. Alternatively, pivoted lever arms or other mechanical linkages may be used in conjunction with, or in lieu of, the connecting rods and crankshaft throws to operatively connect the offset pistons to the crankshaft.

Certain technology relating to reciprocating piston internal combustion engines in which the crankshaft axis is offset from, i.e., does not intersect with, the piston-cylinder axes is described in U.S. Pat. Nos. 810,347; 2,957,455; 2,974,541; 4,628,876; 4,945,866; and 5,146,884; in Japan patent document 60-256,642; in Soviet Union patent document 1551-880-A; and in Japanese Society of Automotive Engineers (JSAE) Convention Proceedings, date 1996, issue 966, pages 129–132. According to descriptions contained in those publications, the various engine geometries are motivated by various considerations, including power and torque improvements and friction and vibration reductions. Additionally, in-line, or straight engines in which the crankshaft axis is offset from the piston axes were used in early twentieth century racing engines.

However, all of the improvements gained were due to increasing the torque angles on the power stroke only. Unfortunately, as will be discussed in greater detail hereinafter, the greater the advantage an offset was to the power stroke was also accompanied by an associated increasing disadvantage to the compression stroke. Therefore, the degree of offset quickly becomes self limiting, wherein the advantages to torque, power, friction and vibration to the power stroke do not out weigh the disadvantages to the same functions on the compression stroke. Additionally, no advantages were taught or discussed regarding offsets to optimize the compression stroke.

By way of example, a recent prior art attempt to increase efficiency in a standard engine 10 type design through the use of an offset is disclosed in U.S. Pat. No. 6,058,901 to Lee. Lee believes that improved efficiency will result by reducing the frictional forces of the piston rings on the side walls over the full duration of two revolutions of a four stroke cycle (see Lee, column 4, lines 1016). Lee attempts to accomplish this by providing an offset cylinder, wherein the timing of combustion within each cylinder is controlled to cause maximum combustion pressure to occur when an imaginary plane that contains both a respective connection axis of a respective connecting rod to the respective piston and a respective connection axis of the connecting rod to a respective throw of the crankshaft is substantially coincident with the respective cylinder axis along which the piston reciprocates.

However, though the offset is an advantage during the power stroke, it becomes a disadvantage during the compression stroke. That is, when the piston travels from bottom dead center to top dead center during the compression stroke, the offset piston-cylinder axis creates an angle between the crankshaft throw and connecting rod that reduces the torque applied to the piston. Additionally, the side forces resulting from the poor torque angles on the compression stroke actually increase wear on the piston rings. Accordingly, a greater amount of power must be consumed in order to compress the gas to complete the compression stroke as the offset increases. Therefore, the amount of offset is severely limited by its own disadvantages on the compression side. Accordingly, large prior art offsets, i.e., offsets in which the crankshaft must rotate at least 20 degrees past a pistons top dead center position before the piston can reach a firing position, have not been utilized, disclosed or taught. As a result, the relatively large offsets required to substantially align peak torque to peak combustion pressure cannot be accomplished with Lee's invention.

Variable Compression Ratio (VCR) engines are a class of prior art CI engines designed to take advantage of varying the compression ratio on an engine to increase efficiency. One such typical example is disclosed in U.S. Pat. No. 4,955,328 to Sobotowski. Sobotowski describes an engine in which compression ratio is varied by altering the phase relation between two pistons operating in cylinders interconnected through a transfer port that lets the gas flow in both directions.

However, altering the phase relation to vary compression ratios impose design requirements on the engine that greatly increase its complexity and decrease its utility. For example, each piston of the pair of pistons must reciprocate through all four strokes of a complete four stroke cycle, and must be driven by a pair of crankshafts which rotate through two full revolutions per four stroke cycle. Additionally, the linkages between the pair of crankshafts become very complex and heavy. Also the engine is limited by design to CI engines due to the higher compression ratios involved.

Various other relatively recent specialized prior art engines have also been designed in an attempt to increase engine efficiency. One such engine is described in U.S. Pat. No. 5,546,897 to Bracken entitled "Internal Combustion Engine with Stroke Specialized Cylinders". In Brackett, the engine is divided into a working section and a compressor section. The compressor section delivers charged air to the working section, which utilizes a scotch yoke or conjugate drive motion translator design to enhance efficiency. The specialized engine can be described as a horizontally opposed engine in which a pair of opposed pistons reciprocate in opposing directions within one cylinder block.

However, the compressor is designed essentially as a super charger which delivers supercharged gas to the working section. Each piston in the working section must reciprocate through all four strokes of intake, compression, power and exhaust, as each crankshaft involved must complete two full revolutions per four-stroke cycle. Additionally, the design is complex, expensive and limited to very specialized CI engines.

Another specialized prior art design is described in U.S. Pat. No. 5,623,894 to Clarke entitled "Dual Compression and Dual Expansion Engine". Clarke essentially discloses a specialized two-stroke engine where opposing pistons are disposed in a single cylinder to perform a power stroke and a compression stroke. The single cylinder and the crowns of the opposing pistons define a combustion chamber, which is located in a reciprocating inner housing. Intake and exhaust of the gas into and out of the combustion chamber is performed by specialized conical pistons, and the reciprocating inner housing.

However, the engine is a highly specialized two-stroke system in which the opposing pistons each perform a compression stroke and a power stroke in the same cylinder. Additionally, the design is very complex requiring dual crankshafts, four pistons and a reciprocating inner housing to complete the single revolution two-stroke cycle. Also, the engine is limited to large CI engine applications.

Accordingly, there is a need for an improved four-stroke internal combustion engine, which can enhance efficiency by more closely aligning the torque and force curves generated during a power stroke without increasing compression ratios substantially beyond normally accepted design limits.

SUMMARY OF THE INVENTION

The present invention offers advantages and alternatives over the prior art by providing a four-stroke cycle internal combustion engine having a pair of pistons in which one piston of the pair is used for the intake and compression strokes and another piston of the pair is used for the power and exhaust strokes, with each four stroke cycle being completed in one revolution of the crankshaft. The engine enhances efficiency by more closely aligning the torque and force curves generated during a power stroke without increasing compression ratios.

These and other advantages are accomplished in an exemplary embodiment of the invention by providing a four stroke cycle internal combustion engine including a crankshaft rotating about a crankshaft axis of the engine. A power piston is slidably received within a first cylinder and operatively connected to the crankshaft such that the power piston reciprocates through a power stroke and an exhaust stroke of a four stroke cycle during a single rotation of the crankshaft. A compression piston is slidably received within a second cylinder and operatively connected to the crankshaft such that the compression piston reciprocates through an intake stroke and a compression stroke of the same four stroke cycle during the same rotation of the crankshaft. A power piston-cylinder axis along which the power piston reciprocates within the first cylinder has an offset from the crankshaft axis such that the power piston-cylinder axis does not intersect the crankshaft axis. A gas passage interconnects the first and second cylinders. The gas passage includes an inlet valve and an outlet valve defining a pressure chamber therebetween. The inlet valve permits substantially one way flow of compressed gas from the second cylinder to the pressure chamber and the outlet valve permits substantially one way flow of compressed gas from the pressure chamber to the first cylinder. The inlet valve and the outlet valve of the gas passage substantially maintain at least a predetermined firing condition gas pressure in the pressure chamber during the entire four stroke cycle.

In an alternative embodiment of the invention the engine includes a compression piston-cylinder axis along which the compression piston reciprocates within the second cylinder. The compression piston-cylinder axis has an offset from the crankshaft axis such that the compression piston-cylinder axis does not intersect the crankshaft axis.

DETAILED DESCRIPTION OF THE PREFERRED EMBODIMENTS

Figure 7:
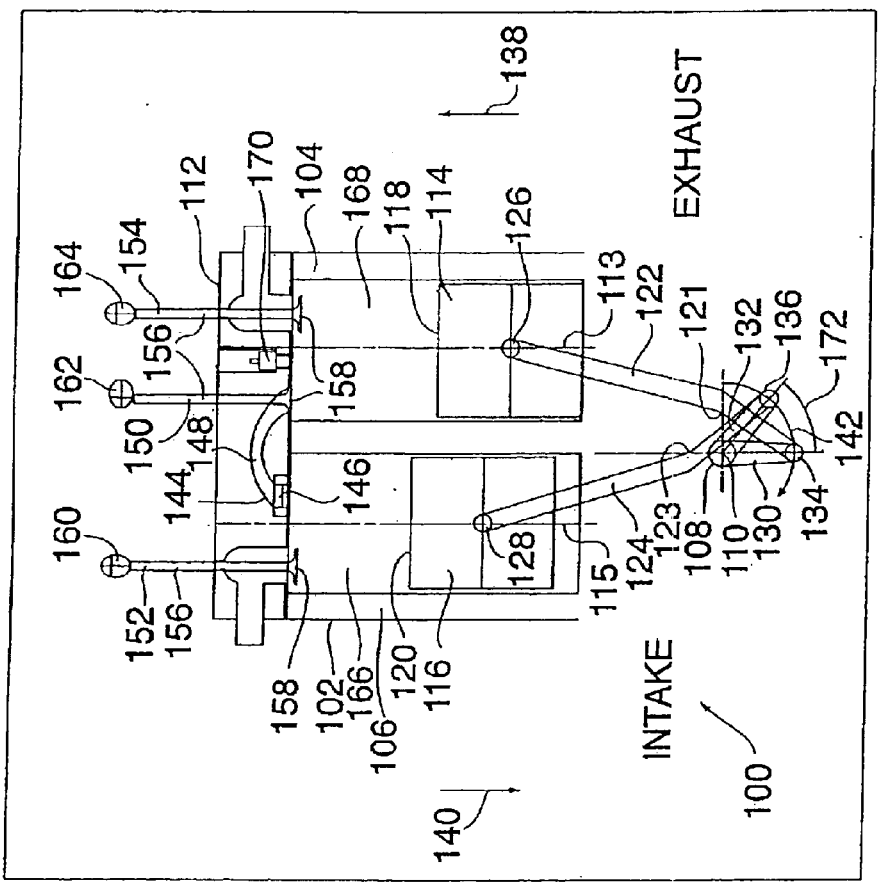
FIG. 7 is a schematic diagram of an engine in accordance with the present invention during the exhaust and intake strokes.
Figure 5:
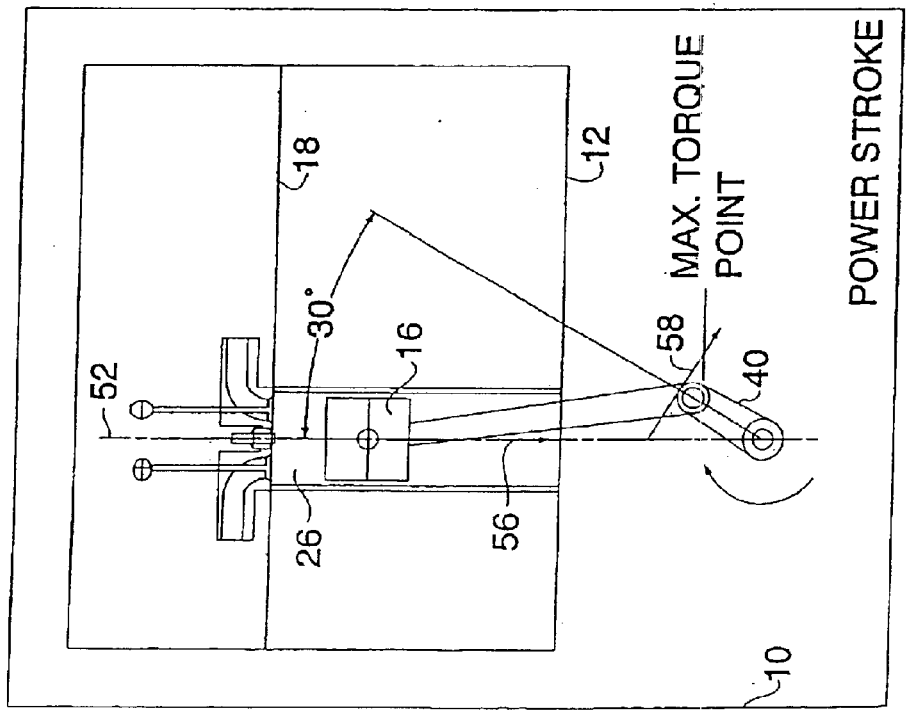
FIG. 5 is a schematic diagram of the prior art engine of FIG. 1 when the piston is at the position of maximum torque.

Referring to FIG. 7, an exemplary embodiment of a four stroke internal combustion engine in accordance with the present invention is shown generally at 100. The engine 100 includes an engine block 102 having a first cylinder 104 and a second cylinder 106 extending therethrough. A crankshaft 108 is journaled for rotation about a crankshaft axis 110 (extending perpendicular to the plane of the paper).

The engine block 102 is the main structural member of the engine 100 and extends upward from the crankshaft 108 to the junction with the cylinder head 112. The engine block 102 serves as the structural framework of the engine 100 and typically carries the mounting pad by which the engine is supported in the chassis (not shown). The engine block 102 is generally a casting with appropriate machined surfaces and threaded holes for attaching the cylinder head 112 and other units of the engine 100.

The cylinders 104 and 106 are openings, typically of generally circular cross section, that extend through the upper portion of the engine block 102. Cylinders are defined herein as the chambers within which pistons of an engine reciprocate, and do not have to be generally circular in cross section, e.g., they may have a generally elliptical or half moon shape.

The internal walls of cylinders 104 and 106 are bored and polished to form smooth, accurate bearing surfaces sized to receive a first power piston 114, and a second compression piston 116 respectively. The power piston 114 reciprocates along a first piston-cylinder axis 113, and the compression piston 116 reciprocates along a second piston-cylinder axis 115. The first and second cylinders 104 and 106 are disposed in the engine 100 such that the first and second piston-cylinder axes 113 and 115 pass on opposing sides of the crankshaft axis 110 without intersecting the crankshaft axis 110.

The pistons 114 and 116 are typically cup shaped cylindrical castings of steel or aluminum alloy. The upper closed ends, i.e., tops, of the power and compression pistons 114 and 116 are the first and second crowns 118 and 120 respectively. The outer surfaces of the pistons 114,116 are generally machined to fit the cylinder bore closely and are typically grooved to receive piston rings (not shown) that seal the gap between the pistons and the cylinder walls.

First and second connecting rods 122 and 124 each include an angle bend 121 and 123 respectively. The connecting rods 122 and 124 are pivotally attached at their top distal ends 126 and 128 to the power and compression pistons 114 and 116 respectively. The crankshaft 108 includes a pair of mechanically offset portions called the first and second throws 130 and 132, which are pivotally attached to the bottom opposing distal ends 134 and 136 of the first and second connecting rods 122 and 124 respectively. The mechanical linkages of the connecting rods 122 and 124 to the pistons 114, 116 and crankshaft throws 130,132 serve to convert the reciprocating motion of the pistons (as indicated by directional arrow 138 for the power piston 114, and directional arrow 140 for the compression piston 116) to the rotary motion (as indicated by directional arrow 142) of the crankshaft 108. The first piston cylinder axis 113 is offset such that it is disposed in the imaginary half plane through which the first crankshaft throw 130 rotates from its top dead center position to its bottom dead center position. The second piston cylinder axis 115 is offset in the opposing imaginary half plane.

Though this embodiment shows the first and second pistons 114 and 116 connected directly to crankshaft 108 through connecting rods 122 and 124 respectively, it is within the scope of this invention that other means may also be employed to operatively connect the pistons 114 and 116 to the crankshaft 108. For example a second crankshaft may be used to mechanically link the pistons 114 and 116 to the first crankshaft 108.

The cylinder head 112 includes a gas passage 144 interconnecting the first and second cylinders 104 and 106. The gas passage includes an inlet check valve 146 disposed in a distal end of the gas passage 144 proximate the second cylinder 106. An outlet poppet valve 150 is also disposed in an opposing distal end of the gas passage 144 proximate the top of the first cylinder 104. The inlet check valve 146 and outlet poppet valve 150 define a pressure chamber 148 there between. The inlet valve 146 permits the one way flow of compressed gas from the second cylinder 106 to the pressure chamber 148. The outlet valve 150 permits the one way flow of compressed gas from the pressure chamber 148 to the first cylinder 104. Though check and poppet type valves are described as the inlet and the outlet valves 146 and 150 respectively, any valve design appropriate for the application may be used instead, e.g., the inlet valve 146 may also be of the poppet type.

The cylinder head 112 also includes an intake valve 152 of the poppet type disposed over the top of the second cylinder 106, and an exhaust valve 154 of the poppet type disposed over the top to the first cylinder 104. Poppet valves 150,152 and 154 typically have a metal shaft 156 with a disk 158 at one end fitted to block the valve opening. The other end of the shafts 156 of poppet valves 150, 152 and 154 are mechanically linked to camshafts 160,162 and 164 respectively. The camshafts 160,162 and 164 are typically a round rod with generally oval shaped lobes located inside the engine block 102 or in the cylinder head 112.

The camshafts 160,162 and 164 are mechanically connected to the crankshaft 108, typically through a gear wheel, belt or chain links (not shown). When the crankshaft 108 forces the camshafts 160, 162 and 164 to turn, the lobes on the camshafts 160, 162 and 164 cause the valves 150,152 and 154 to open and close at precise moments in the engine's cycle.

The crown 120 of compression piston 116, the walls of second cylinder 106 and the cylinder head 112 form a compression chamber 166 for the second cylinder 106. The crown 118 of power piston 114, the walls of first cylinder 104 and the cylinder head 112 form a separate combustion chamber 168 for the first cylinder 104. A spark plug 170 is disposed in the cylinder head 112 over the first cylinder 104 and is controlled by a control device (not shown) which precisely times the ignition of the compressed air gas mixture in the combustion chamber 168. Though this embodiment describes a spark ignition (SI) engine, one skilled in the art would recognize that compression ignition (CI) engines are within the scope of this invention also.

During operation, the power piston 114 leads the compression piston 116 by a phase shift angle 172, defined by the degrees of rotation the crankshaft 108 must rotate after the power piston 114 has reached its top dead center position in order for the compression piston 116 to reach its respective top dead center position. Preferably this phase shift is between 30 to 60 degrees. For this particular preferred embodiment, the phase shift is fixed substantially at 50 degrees.

FIG. 7 illustrates the power piston 114 when it has reached its bottom dead center (BDC) position and has just started ascending (as indicated by arrow 138) into its exhaust stroke. Compression piston 116 is lagging the power piston 114 by 50 degrees and is descending (arrow 140) through its intake stroke. The inlet valve 156 is open to allow an explosive mixture of fuel and air to be drawn into the compression chamber 166. The exhaust valve 154 is also open allowing piston 114 to force spent products of combustion out of the combustion chamber 168.

The check valve 146 and poppet valve 150 of the gas passage 144 are closed to prevent the transfer of ignitable fuel and spent combustion products between the two chambers 166 and 168. Additionally during the exhaust and intake strokes, the inlet check valve 146 and outlet poppet valve 150 seal the pressure chamber 148 to substantially maintain the pressure of any gas trapped therein from the previous compression and power strokes.

Figure 8:
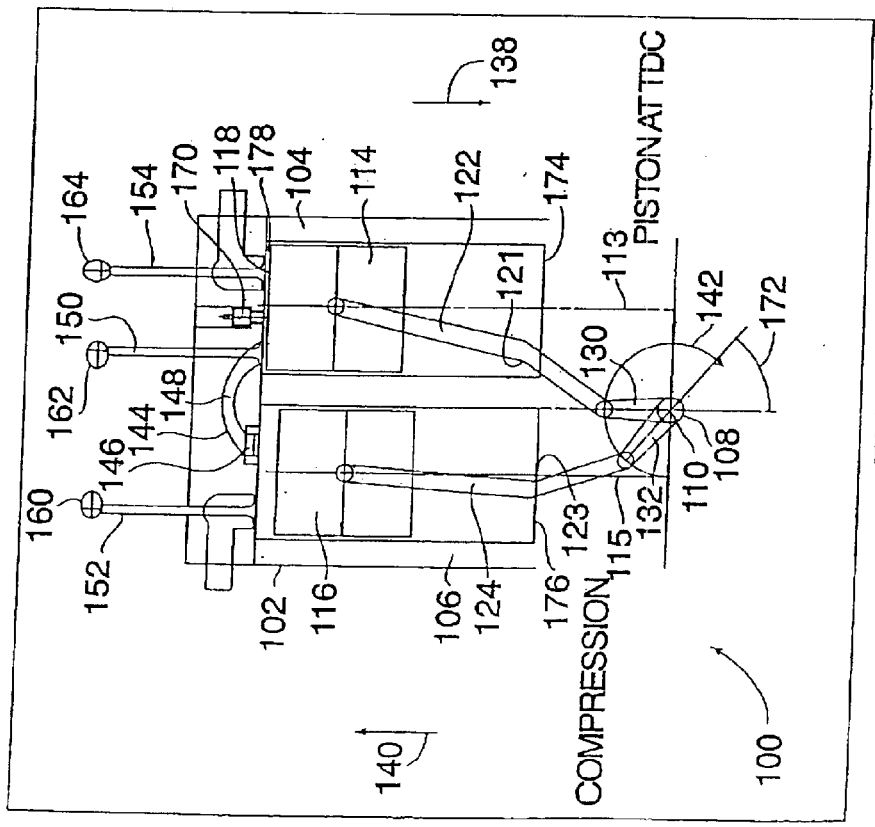
FIG. 8 is a schematic diagram of the engine of FIG. 7 when the first piston has just reached top dead center (TDC) at the beginning of a power stroke.

Referring to FIG. 8, the power piston 114 has reached its top dead center (TDC) position and is about to descend into its power stroke (indicated by arrow 138), while the compression piston 116 is ascending through its compression stroke (indicated by arrow 140). At this point, inlet check valve 146, outlet valve 150, intake valve 152 and exhaust valve 154 are all closed.

Figure 2:
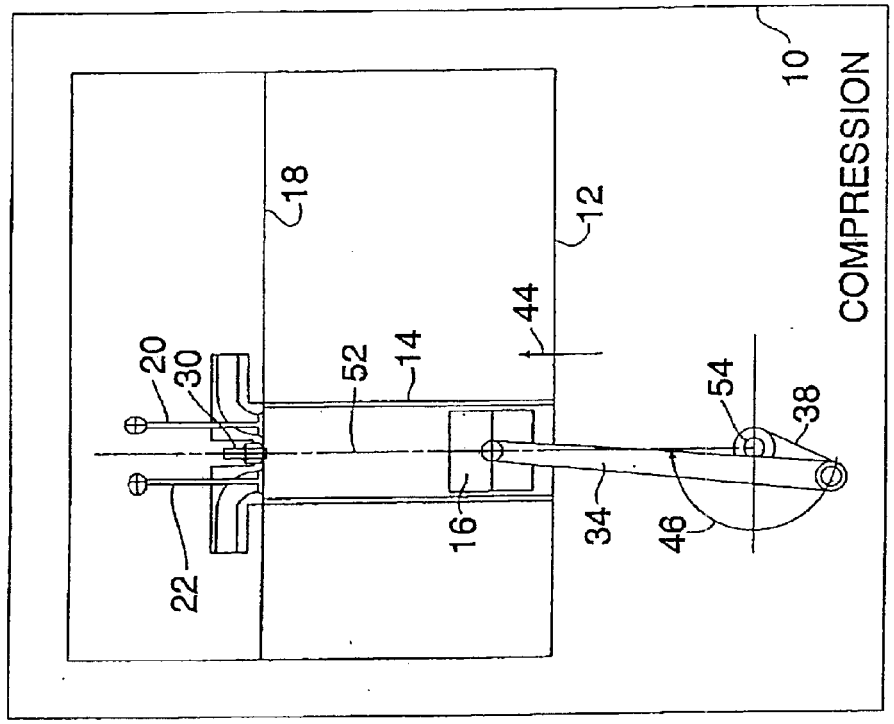
FIG. 2 is a schematic diagram of the prior art engine of FIG. 1 during the compression stoke.
Figure 1:
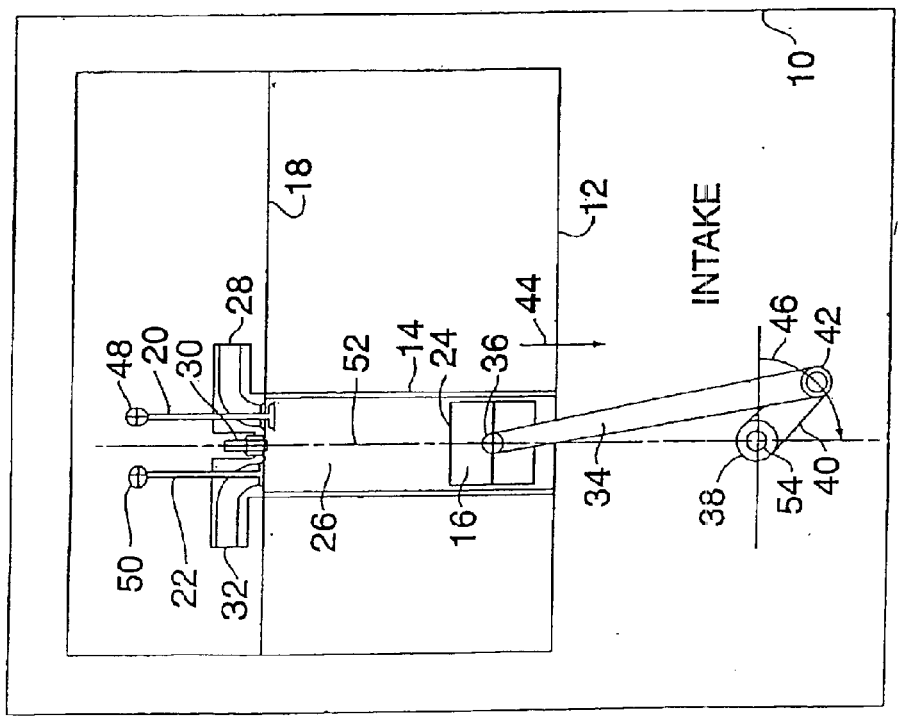
FIG. 1 is a schematic diagram of a representative prior art four stroke cycle engine, during the intake stoke.
Figure 4:
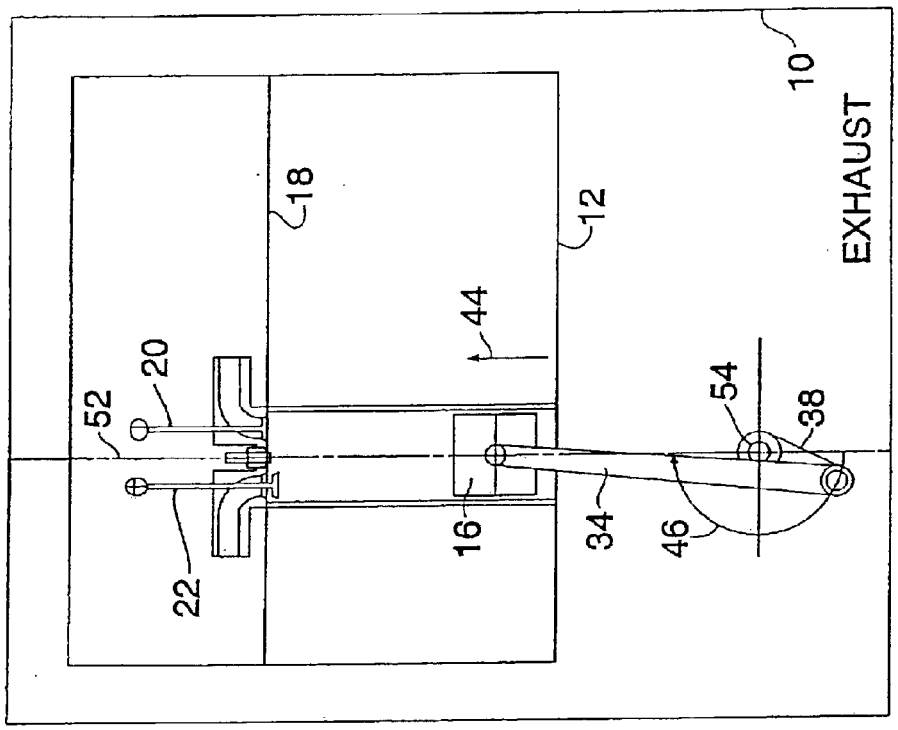
FIG. 4 is a schematic diagram of the prior art engine of FIG. 1 during the exhaust stoke.
Figure 3:
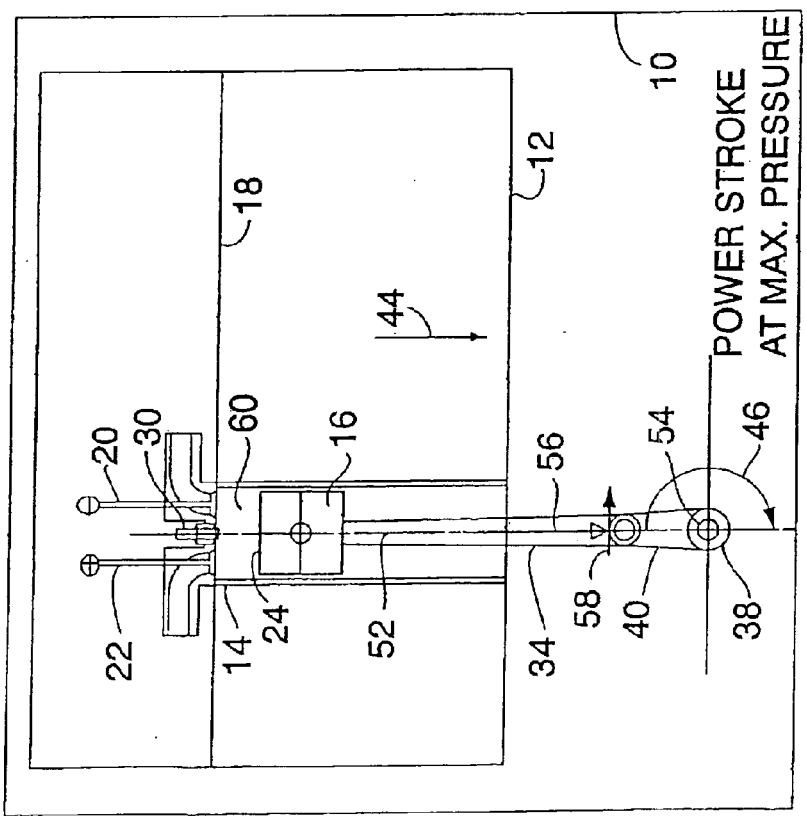
FIG. 3 is a schematic diagram of the prior art engine of FIG. 1 during the power stoke.

At TDC piston 114 has a clearance distance 178 between the crown 118 of the piston 114 and the top of the cylinder 104. This clearance distance 178 is very small by comparison to the clearance distance 60 of standard engine 10 (best seen in FIG. 3). This is because the power stroke in engine 100 follows a low pressure exhaust stroke, while the power stroke in standard engine 10 follows a high pressure compression stroke. Therefore, in distinct contrast to the standard engine 10, there is little penalty to engine 100 to reduce the clearance distance 178 since there is no high pressure gas trapped between the crown 118 and the top of the cylinder 114. Moreover, by reducing the clearance distance 178, a more thoroughly flushing of nearly all exhaust products is accomplished.

In order to substantially align the point of maximum torque with maximum combustion pressure, the crankshaft 108 must be rotated approximately 40 degrees past its top dead center position when the power piston 114 is in its optimal firing position. Additionally, similar considerations hold true on the compression piston 116, in order to reduce the amount of torque and power consumed by the crankshaft 108 during a compression stroke. Both of these considerations require that the offsets on the piston-cylinder axes be much larger than any previous prior art offsets, i.e., offsets in which the crankshaft must rotate at least 20 degrees past a pistons top dead center position before the piston can reach a firing position. These offsets are in fact so large that a straight connecting rod linking the pistons 114 and 116 would interfere with the lower distal end of the cylinders 104 and 106 during a stroke.

Accordingly, the bend 121 in connecting rod 122 must be disposed intermediate its distal ends and have a magnitude such that the connecting rod 122 clears the bottom distal end 174 of cylinder 104 while the power piston 114 reciprocates through an entire stroke. Additionally, the bend 123 in connecting rod 124 must be disposed intermediate its distal ends and have a magnitude such that the connecting rod 124 clears the bottom distal end 176 of cylinder 106 while the compression piston 116 reciprocates through an entire stroke.

Figure 9:
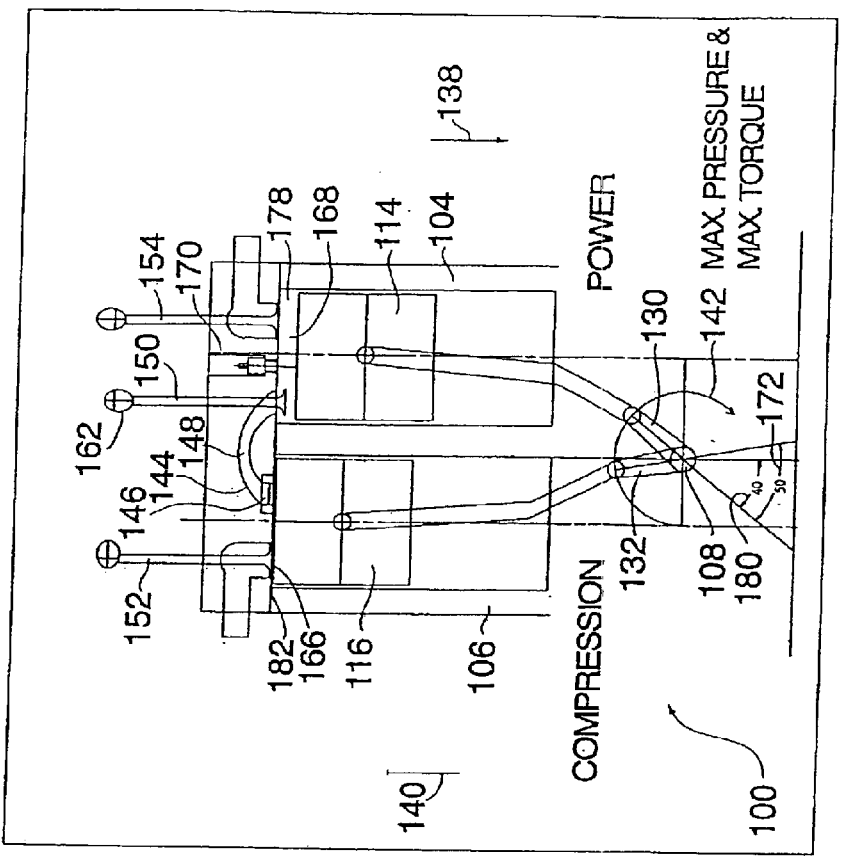
FIG. 9 is a schematic diagram of the engine of FIG. 7 when the first piston has reached its firing position.

Referring to FIG. 9, the crankshaft 108 has rotated an additional 40 degrees (as indicated by arrow 180) past the TDC position of power piston 114 to reach its firing position, and the compression piston 116 is Just completing its compression stroke. During this 40 degrees of rotation, the compressed gas within the second cylinder 116 reaches a threshold pressure which forces the check valve 146 to open, while cam 162 is timed to also open outlet valve 150. Therefore, as the power piston 114 descends and the compression piston 116 ascends, a substantially equal mass of compressed gas is transferred from the compression chamber 166 of the second cylinder 106 to the combustion chamber 168 of the first cylinder 104. When the power piston 114 reaches its firing position, check valve 146 and outlet valve 150 close to prevent any further gas transfer through pressure chamber 148. Accordingly, the mass and pressure of the gas within the pressure chamber 148 remain relatively constant before and after the gas transfer takes place. In other words, the gas pressure within the pressure chamber 148 is maintained at least (at or above) a predetermined firing condition pressure, e.g., approximately 270 psia, for the entire four stroke cycle.

By the time the power piston 114 has descended to its firing position from TDC, the clearance distance 178 has grown to substantially equal that of the clearance distance 60 of standard engine 10 (best seen in FIG. 3), i.e., 0.571. Additionally, the firing conditions are substantially the same as the firing conditions of the standard engine 10, which are generally: 1) a 4 inch diameter piston, 2) a clearance volume of 7.181 cubic inches, 3) a pressure before ignition of approximately 270 pounds per square inch absolute (psia), and 4) a maximum combustion pressure after ignition of approximately 1200 psia. Moreover, the angle of the first throw 130 of crankshaft 108 is in its maximum torque position, i.e., approximately 40 degrees past TDC. 'Therefore, spark plug 170 is timed to fire such that maximum combustion pressure occurs when the power piston 114 substantially reaches its position of maximum torque.

During the next 10 degrees of rotation 142 of the crankshaft 108, the compression piston 116 will pass through to its TDC position and thereafter start another intake stroke to begin the cycle over again. The compression piston 116 also has a very small clearance distance 182 relative to the standard engine 10. This is possible because, as the gas pressure in the compression chamber 166 of the second cylinder 106 reaches the pressure in the pressure chamber 148, the check valve 146 is forced open to allow gas to flow through. Therefore, very little high pressure gas is trapped at the top of the power piston 116 when it reaches its TDC position.

The compression ratio of engine 100 can be anything within the realm of SI or CI engines, but for this exemplary embodiment it is substantially within the range of 6 to 8.5. As defined earlier, the compression ratio is the maximum volume of a predetermined mass of an air-fuel mixture before a compression stroke, divided by the volume of the mass of the air-fuel mixture at the point of ignition. For the engine 100, the compression ratio is substantially the ratio of the displacement volume in second cylinder 106 when the compression piston 116 travels from SDC to TDC to the volume in the first cylinder 104 when the power piston 114 is at its firing position.

In distinct contrast to the standard engine 10 where the compression stroke and the power stroke are always performed in sequence by the same piston, the power stroke is performed by the power piston 114 only, and the compression stroke is performed by the compression piston 116 only. Therefore, the power piston 116 can be offset to align maximum combustion pressure with maximum torque applied to the crankshaft 108 without incurring penalty for being out of alignment on the compression stroke. Vice versa, the compression piston 114 can be offset to align maximum compression pressure with maximum torque applied from the crankshaft 108 without incurring penalty for being out of alignment on the power stroke.

Figure 6:
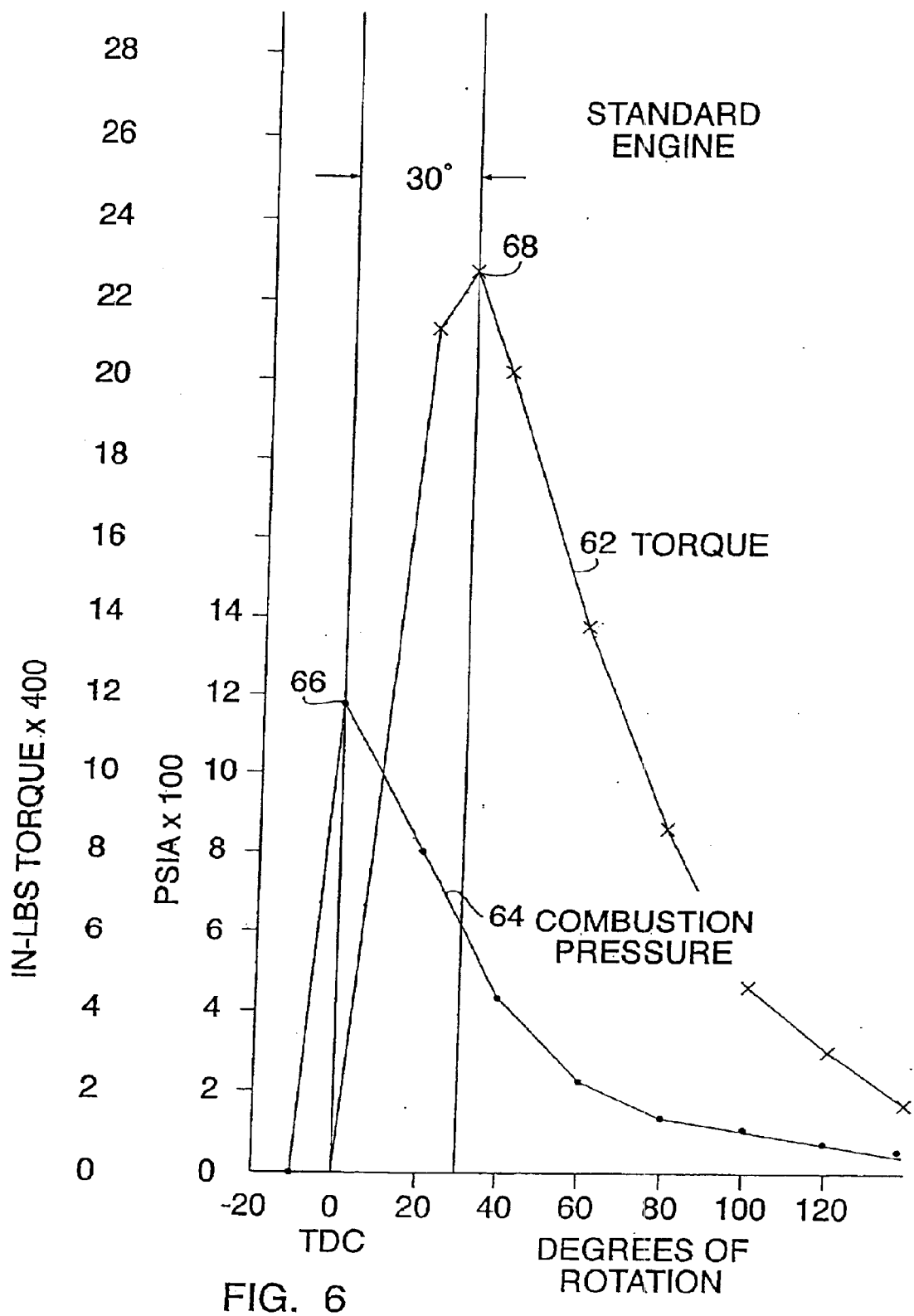
FIG. 6, is a graphical representation of torque and combustion pressure of the prior art engine of FIG. 1.
Figure 10:
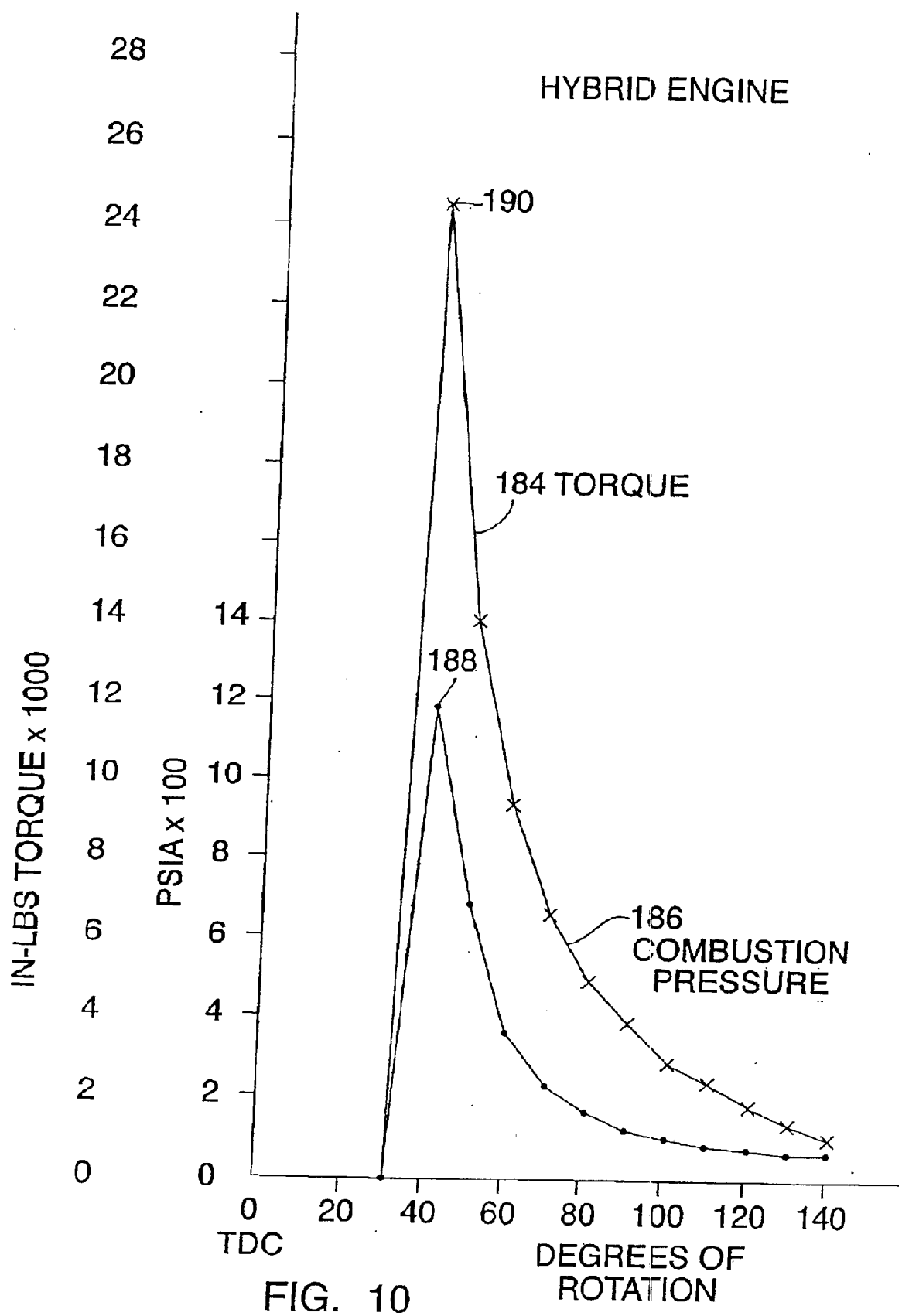
FIG. 10, is a graphical representation of torque and combustion pressure of the engine of FIG. 7.

Referring to FIG. 10, this concept can be further illustrated. Here, a graph of tangential force or torque versus degrees of rotation from TDC for power piston 114 is shown at 184 for the engine 100. Additionally, a graph of combustion pressure versus degrees of rotation from TDC for power piston 114 is shown at 186 for engine 100. The calculations for the graphs 184 and 186 were based on the engine 100 having firing conditions substantially equal to that of a standard engine. That is: 1) a 4 inch diameter piston, 2) a clearance volume of 7.181 cubic inches, 3) a pressure before ignition of approximately 270 pounds per square inch absolute (psia), 4) a maximum combustion pressure after ignition of approximately 1200 psia and 5) substantially equal revolutions per minute (RPM) of the crankshafts 108 and 38. In distinct contrast with the graphs of FIG. 6 for the standard prior art engine 10, the point of maximum combustion pressure 188 is substantially aligned with the point of maximum torque 190. This alignment of combustion pressure 186 with torque 184 results in a significant increase in efficiency.

Moreover, the compression piston's 116 offset can also be optimized to substantially align the maximum torque delivered to the compression piston 116 from the crankshaft 108 with the maximum compression pressure of the gas. The compression pistons 116 offset reduces the amount of power exerted in order to complete a compression stroke and further increases the overall efficiency of engine 100 relative to the standard engine 10. With the combined power and compression piston 114, and 116 offsets, the overall theoretical efficiency of engine 100 can be increased by approximately 20 to 40 percent relative to the standard engine.

Figure 11:
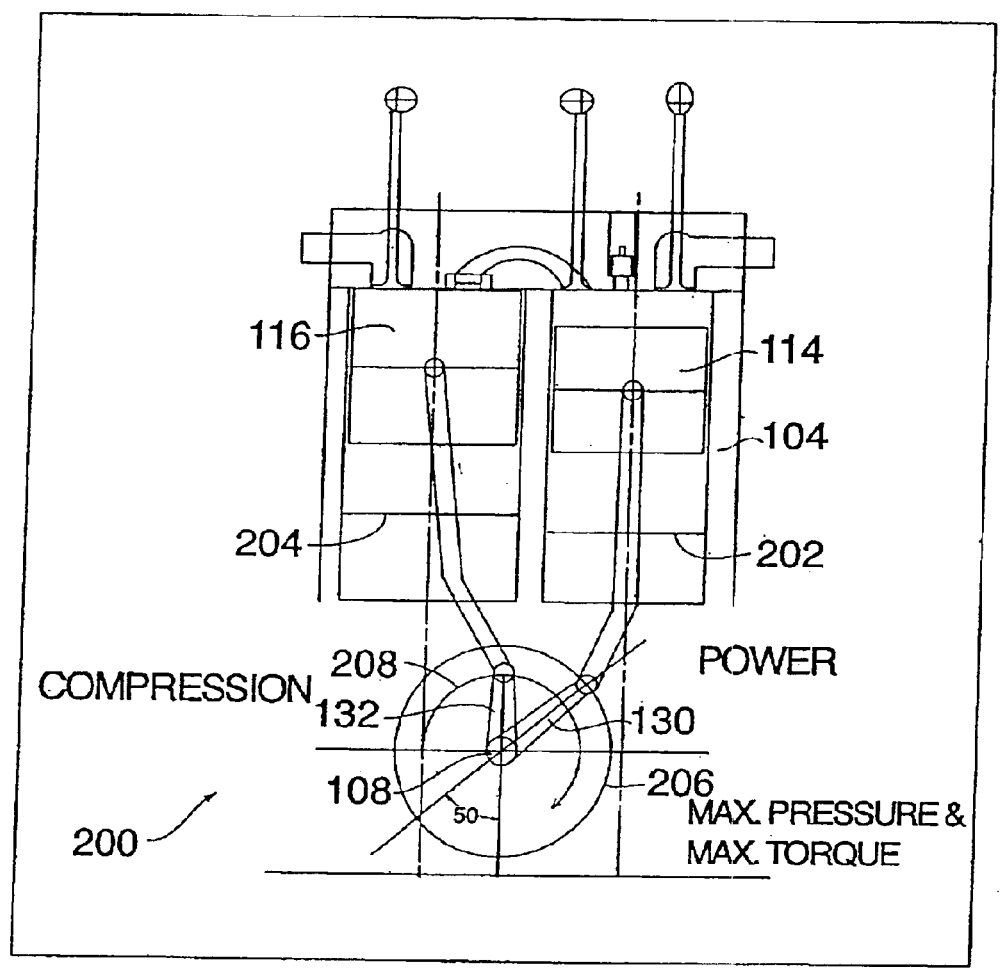
FIG. 11 is a schematic diagram of an alternative embodiment of an engine in accordance with the present invention having unequal throws and piston diameters.

Referring to FIG. 11, an alternative embodiment of a split four stroke engine having unequal throws and unequal piston diameters is shown generally at 200. Because the compression and power strokes are performed by separate pistons 114, 116, various enhancements can be made to optimize the efficiency of each stroke without the associated penalties incurred when the strokes are performed by a single piston. For example, the compression piston diameter 204 can be made larger than the power piston diameter 202 to further increase the efficiency of compression. Additionally, the radius 206 of the first throw 130 for the power piston 114 can be made larger than the radius 208 of the second throw 132 for the compression piston 116 to further enhance the total torque applied to the crankshaft 108.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An engine comprising:

a crankshaft, rotating about a crankshaft axis of the engine;

a power piston slidably received within a first cylinder and operatively connected to the crankshaft via first linkage system such that the power piston reciprocates through a power stroke and an exhaust stroke of a four stroke cycle during a single rotation of the crankshaft;

a compression piston slidably received within a second cylinder and operatively connected to the crankshaft via second linkage system, wherein the first and second linkage systems share no common mechanical link, and such that the compression piston reciprocates through an intake stroke and a compression stroke of the same four stroke cycle during the same revolution of the crankshaft; and a gas passage interconnecting the first and second cylinders, the passage including an inlet valve and an outlet valve defining a pressure chamber therebetween;

wherein the power piston leads the compression piston by a phase shift angle that is substantially equal to or greater than zero degrees and less than 30 degrees.

2. The engine of claim 1 wherein the power piston leads the compression piston by a phase shift angle that is substantially equal to or greater than 5 degrees and is substantially equal to or less than 29 degrees.

3. An engine comprising:

a crankshaft, rotating about a crankshaft axis of the engine;

a power piston slidably received within a first cylinder and operatively connected to the crankshaft such that the power piston reciprocates through a power stroke and an exhaust stroke of a four stroke cycle during a single rotation of the crankshaft;

a compression piston slidably received within a second cylinder and operatively connected to the crankshaft such that the compression piston reciprocates through an intake stroke and a compression stroke of the same four stroke cycle during the same rotation of the crankshaft; and a gas passage interconnecting the first and second cylinders, the passage including an inlet valve and an outlet valve defining a pressure chamber therebetween;

wherein the power piston leads the compression piston by a phase shift angle that is substantially equal to or greater than 20 degrees and less than 30 degrees.

4. The engine of claim 3 wherein the power piston leads the compression piston by a phase shift angle that is substantially equal to or greater than 20 degrees and is substantially equal to or less than 29 degrees.

* * * * *